(12) United States Patent
Vaile

(10) Patent No.: US 6,609,581 B2
(45) Date of Patent: Aug. 26, 2003

(54) STABLE LEVELER

(75) Inventor: Bruce Vaile, Burlington (CA)

(73) Assignee: Tigercat Industries Inc., Paris (CA)

(*) Notice: Subject to any disclaimer, the term of this patent is extended or adjusted under 35 U.S.C. 154(b) by 36 days.

(21) Appl. No.: 09/951,651

(22) Filed: Sep. 13, 2001

(65) Prior Publication Data
US 2003/0047367 A1 Mar. 13, 2003

(51) Int. Cl.$^7$ ............................ B62D 33/067
(52) U.S. Cl. .................... 180/39.14; 280/6.15
(58) Field of Search .............. 180/89.13, 89.14, 180/89.15; 280/6.154, 6.15, 6.153, 6.155, 6.157

(56) References Cited

U.S. PATENT DOCUMENTS

| | | |
|---|---|---|
| 2,523,734 A | 9/1950 | Stephenson et al. |
| 3,184,867 A | 5/1965 | Symmank |
| 3,218,015 A | 11/1965 | Baer |
| 3,233,909 A | 2/1966 | Boone |
| 3,527,435 A | 9/1970 | Lapp et al. |
| 3,658,146 A | 4/1972 | Trivero |
| 3,658,286 A | 4/1972 | Terai et al. |
| 3,670,834 A | 6/1972 | Rogers |
| 3,689,090 A | 9/1972 | Dunaevsky et al. |
| 4,256,279 A | 3/1981 | Duel |
| 4,326,571 A | 4/1982 | Crawford |
| 4,565,486 A | 1/1986 | Crawford et al. |
| 4,650,017 A | 3/1987 | Pelletier et al. |
| 4,679,803 A | 7/1987 | Biller et al. |
| 4,708,577 A | 11/1987 | Fratzke |
| 4,763,742 A | 8/1988 | Langford |
| 4,800,936 A | 1/1989 | Pomies et al. |
| 5,337,847 A * | 8/1994 | Woods et al. ............... 180/9.52 |
| 6,135,225 A * | 10/2000 | Barsic ...................... 180/89.14 |
| 6,173,973 B1 * | 1/2001 | Robinson ................. 280/6.154 |

* cited by examiner

Primary Examiner—Paul N. Dickson
Assistant Examiner—Faye M. Fleming
(74) Attorney, Agent, or Firm—Hodgson Russ LLP

(57) ABSTRACT

The present invention is directed toward a stabler leveling mechanism for tree harvesters. The present invention utilizes many of the same components of conventional leveling mechanisms for tree harvesters, but it alters the pivot axis of a swing-house assembly. A conventional swing-house assembly pivots about an axis parallel to the top surface of a carriage on level ground. That conventional assembly can be deleterious, therefore, applicant has altered the pivot axis of the swing-house assembly. Admittedly, merely moving the pivot axis seems simple but it is difficult. The components had to be constructed differently to obtain the desired results and simultaneously make the device stable within the working environment.

5 Claims, 6 Drawing Sheets

STABLE LEVELER

FIELD OF THE INVENTION

This invention relates to a mechanism that stabilizes a boom swing-house assembly of a forestry machine by leveling the swing-house in uneven or sloping terrain.

DISCUSSION OF THE PRIOR ART

Forestry machines, such as feller bunchers for harvesting standing trees, are well known. In one type of feller buncher, a saw head which is used to sever the tree is mounted at the end of a boom which has its other end mounted to a turntable so as to be pivotable about a lateral axis relative to the turntable. The turntable is mounted to a turntable support so as to be pivotable about a vertical axis (when the support is vertical). A carriage, which can have tracks or wheels for conveying the turntable support, has a frame to which the turntable support is mounted by a leveling mechanism. The leveling mechanism is operable to vary the position and orientation of the turntable support relative to the carriage, depending upon the slope of the terrain and the orientation of the carriage on the terrain. For example, if trees are being cut on a hillside, the machine will typically be driven onto the hillside so the trees are within reach of the boom and the leveling mechanism adjusted so as to make the axis of the turntable generally vertical. The center of gravity of the swing-house assembly; which includes the boom and the cutting head attached, the engine of the machine and the operator cab; mounted on the turntable, should be in a predetermined positioned. That position should be relative to the carriage so that the machine does not tip forward or backward when the tree is cut and its weight comes to rest on the butt plate of the head.

Such a mechanism has been made using linkages and hydraulic cylinders for moving the linkages as described in U.S. Pat. No. 4,679,803. In that mechanism, one set of links is provided forwardly and another set is provided rearwardly, and hydraulic cylinders connect the links both laterally and longitudinally to tilt the turntable relative to the carriage both about a lateral axis and a longitudinal axis. Other mechanisms for positioning and orienting the swing-house assembly relative to the carriage are also discussed in U.S. Pat. Nos. 4,679,803, and 6,173,973. The latter patent sets forth and confirms that other leveling devices for tree-harvesters require that the swing-house pivot about an axis parallel to the carriage, when the carriage is on a planar surface as shown in FIG. 6. This type of pivot action can be deleterious because the center of gravity is extremely high when a tree is being harvested.

This invention solves that problem by directing the center of gravity of the complete swing house assembly 12 away from the tip axis of the complete machine. The invention is successful because, for at least one reason, of the unique orientation of the side pivot axis 170.

In Timberjack's Canadian patent application 2276515 claim 5 (a dependent claim), there is a reference to a similar obtuse angle being formed between the turntable major axis 34 and the side tilt axis 170. The present invention improves the angle to achieve better weight transfer and does it without the use of complicated linkages, used in Timberjack's application, to achieve this obtuse angle.

SUMMARY OF THE INVENTION

The present invention is directed toward a stable leveling mechanism for tree harvesters. The present invention utilizes many of the same components of conventional leveling mechanisms for tree harvesters, but it alters the pivot axis of a swing-house assembly. A conventional swing-house assembly pivots about an axis parallel to the top surface of a carriage on level ground. That conventional assembly can be deleterious, therefore, applicant has altered the pivot axis of the swing-house assembly. Admittedly, merely moving the pivot axis seems simple but it is difficult. The components had to be constructed differently to obtain the desired results and simultaneously make the device stable within the working environment.

DETAILED DESCRIPTION OF THE PREFERRED EMBODIMENT

Figure 1:
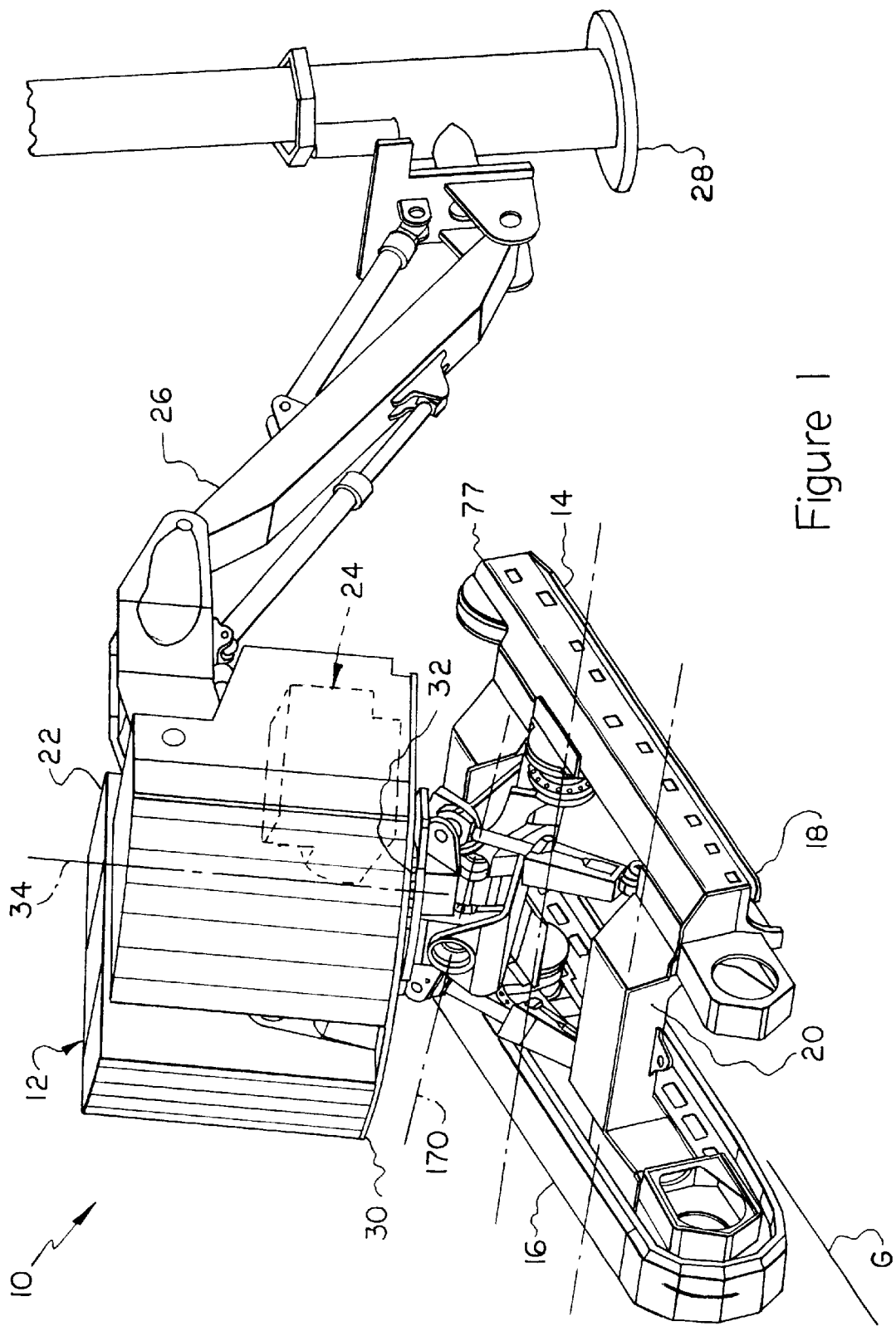
FIG. 1 is a side elevation view of a harvesting device illustrated on a slope, with the swing-house assembly tilted forwardly, with a portion of the track broken away.

FIG. 1 illustrates a forestry machine 10, particularly a feller buncher, which includes a carriage 14 and a swing-house assembly 12. The carriage 14 includes tracks 16 and 18 (not shown). The tracks 16, 18 (not shown) engage the ground G and are mounted to a carriage frame 20 so as to propel the vehicle 10 when driven. The drive mechanism of the tracks 16 and 18 and the general structure of the frame are conventional, may be of any suitable type and are not discussed in detail here.

The swing-house assembly 12 includes a cab 22 in which the vehicle operator sits and controls the vehicle, an engine 24 that provides power for driving the carriage and the hydraulic systems of the vehicle 10, and a boom 26, all of which are mounted to a turntable 30. At the end of the boom opposite from the cab 22, a cutting head 28 is mounted for harvesting a tree. Many different types of cutting heads are available, a high speed disc saw felling head being illustrated. These instruments are well known to those skilled in the art.

As with most turntables, the turntable 30 is mounted to a turntable slew bearing 32 so as to be rotatable about a turntable major axis 34. A ball bearing connection may be used to provide this rotary connection. An internal gear is fixed relative to the turntable slew bearing 32 and a hydraulic motor is fixed to the turntable 30 so as to rotate a pinion which meshes with the internal gear. Driving the pinion along the internal gear serves to rotate the swing-house assembly 14 360° in either direction relative to the turntable support 32. The connection of the turntable to the turntable support and the driving of the turntable about the turntable major axis relative to the turntable support are all conventional, and may be performed in any suitable way to practice the invention.

Figure 2:
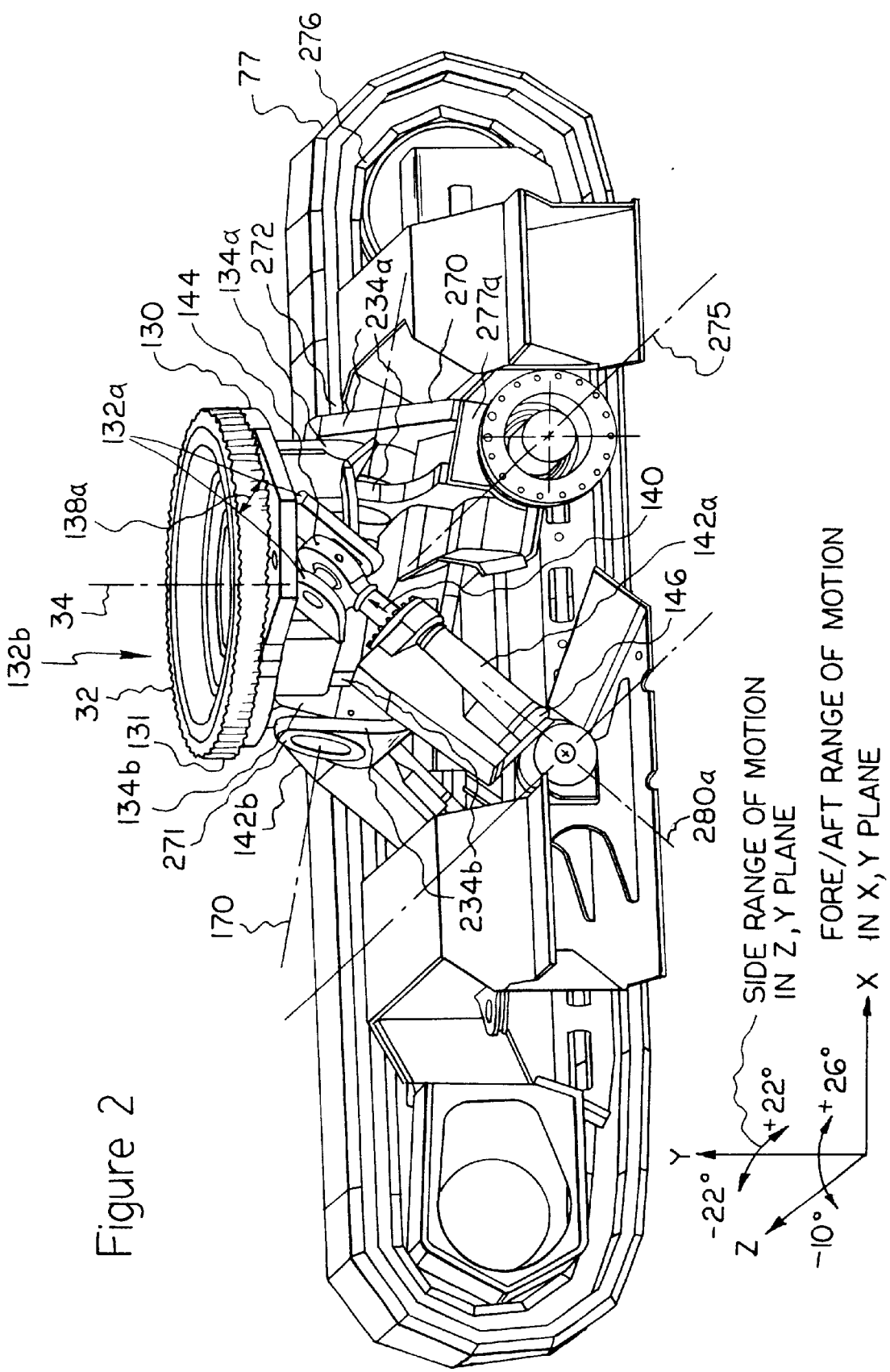
FIG. 2 is an enlarged isometric cross-sectional view of the carriage and the present invention of FIG. 1 showing the turntable slew bearing in a position parallel to the ground.

Turning to FIG. 2, the turntable slew bearing 32 is secured into position over the carriage 14 through a upper pivot support 130 and an intermediate pivot support 270. The upper pivot support 130 and the turntable slew bearing 32 are secured together by conventional methods, such as by bolts 131.

Figure 3:
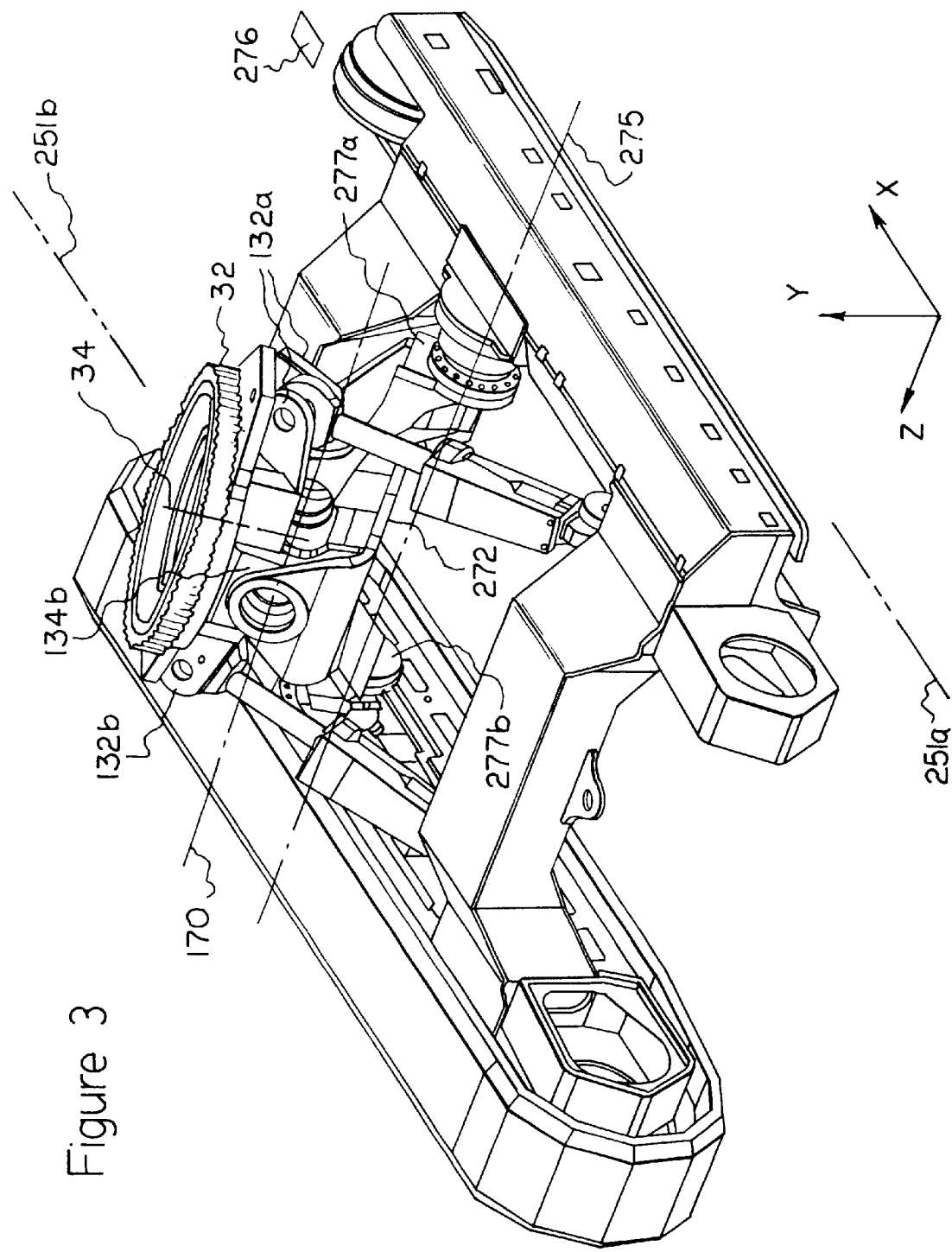
FIG. 3 is an isometric view of the FIG. 1 without the swing-house assembly showing the turntable slew bearing in a position tilt full forward to the ground.

The upper pivot support 130 has at least four flanges, two pairs of rod end lugs 132a, 132b, and two side pivot axis lugs 134a, 134b. The side pivot axis lugs 134 are at or near a 100° angle in relation to the upper pivot support 130 and the turntable slew bearing 32, and extend toward the carriage 14. Each side pivot axis lug 134 has a first aperture 136, as shown in FIG. 3. Assuming the carriage 14 has a front end 77 that is always 12:00 in relation to the upper pivot support 130, then the side pivot axis lugs are at or near 12 and 6 o'clock in relation to the upper pivot support 130. These lugs are at or near the end of the upper pivot support 130.

In contrast, the rod end lugs 132 are positioned at or near 3 and 9 o'clock 172 in relation to the upper pivot support 130. Moreover, the rod end lugs 132 are positioned to allow the full range of motion for the swing-house assembly 12 to be optimized. In particular, the rod end lugs are positioned at an obtuse angle from the turn table major axis toward the rear 76 of the carriage 20 and the ground G. Each rod end lug 132 has a second aperture 138 and each rod end lug 132 is spaced from its corresponding pair by a predetermined distance (D) to allow a force to move between the pair of lugs 132.

The intermediate pivot support 270 provides the female lugs 234a, 234b to receive the side pivot lugs 134a, 134b from the upper pivot support. Two suitable bearing and pin arrangements are use to connect the upper pivot support and the intermediate pivot support 270 and this forms the means for a side to side pivot axis 170.

The intermediate pivot support also provides a fore/aft pivot axis 275 at or near 90° to the side pivot axis 170 and on a plane below the top tangential horizontal level of the front idler wheel 276 and forward of the turntable major axis 34. A suitable bearing connection is made between both outside members 277a & 277b of the intermediate pivot support 270 and the undercarriage 14. Preferably, the angle of the side pivot axis 170 is at an obtuse angle 250 less than 130° from the turn table major axis. The obtuse angle 250 is in the direction of a predetermined working zone of the leveling mechanism (defined in the drawings) to provide maximum effect on the relocation of the center of gravity of the swing-house assembly relative to a side tip axis of the leveling mechanism.

The predetermined force 140a,b is applied by, in this embodiment illustrated as, a hydraulic cylinder 142a, b. The hydraulic cylinder 142 is a conventional unit that is interconnected to the engine 24 and controlled by the user in the cab 22, in the conventional manner known to those of ordinary skill in the art. As with all hydraulic cylinders 142, there is a distal end 144 and a proximal end 146. The distal end 144 pivotally connects between each set of rod end lugs 132 that allows for non-planer movement between the hydraulic cylinder axis 280 and the plane of the turntable 30. The method of pivotally interconnecting the distal end 146 to the set of rod end lugs 132 is done in the conventional method known to those skilled in the art.

In contrast, the proximal end 146 pivotally connects to the carriage 14. This pivotal interconnection must occur on a plane below the top tangential horizontal level of the front idler wheel 276 and behind the turn table major axis 34. The method of pivotally interconnecting the proximal end 146 to the carriage 14 is done in the conventional method known to those skilled in the art. This is referred to as the location of fore/aft pivot.

By being pivotally interconnected to the carriage 14 and allowing the distal end to move within the pair of lateral flanges 132, the hydraulic cylinders 142a, b can lift and alter the plane of the swing-house assembly 12 to a desired position. In relation to the lower level of the tracks 148, the swing house assembly 12 can be tilted anywhere from +26° to −10° in the x,y plane and +22° to −22° in the z,y plane (see FIG. 2) in relation to when the swing-house assembly 12 is parallel to the carriage 14 on level ground, as shown in FIG. 2.

Figure 4:
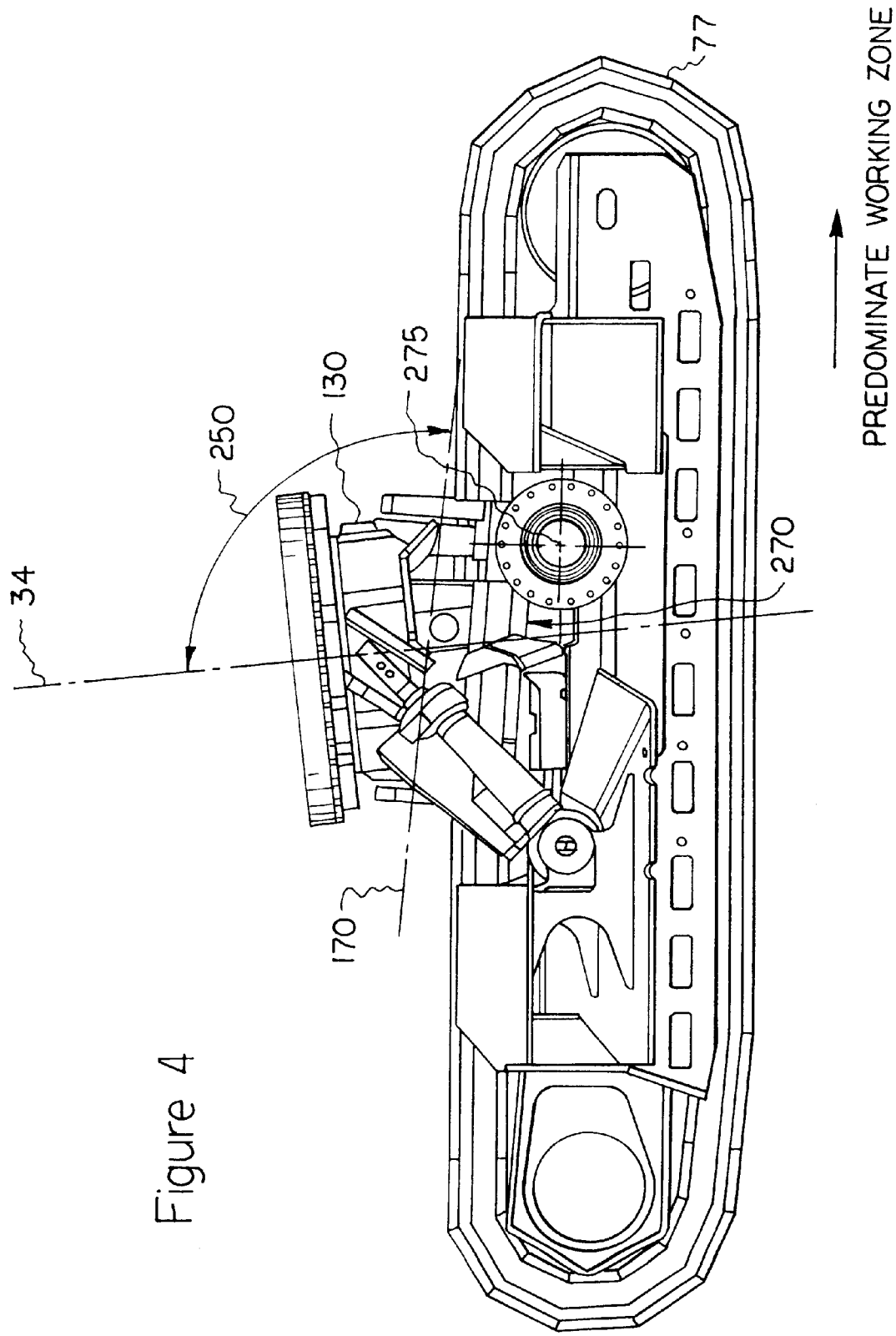
FIG. 4 is an alternative embodiment of FIG. 2 showing the present invention tilting rearwardly.

When the cylinders 143a, b are extended or retracted in unison, the swing-house assembly 12 and upper pivot support 130 pivots about the fore/aft axis 275 either forwardly as illustrated in FIG. 1, or rearwardly as illustrated in FIG. 4. Likewise, when the cylinders 143a, b are extended or retracted in a non-unison manner, the swing-house pivots about the axis 170.

Figure 5:
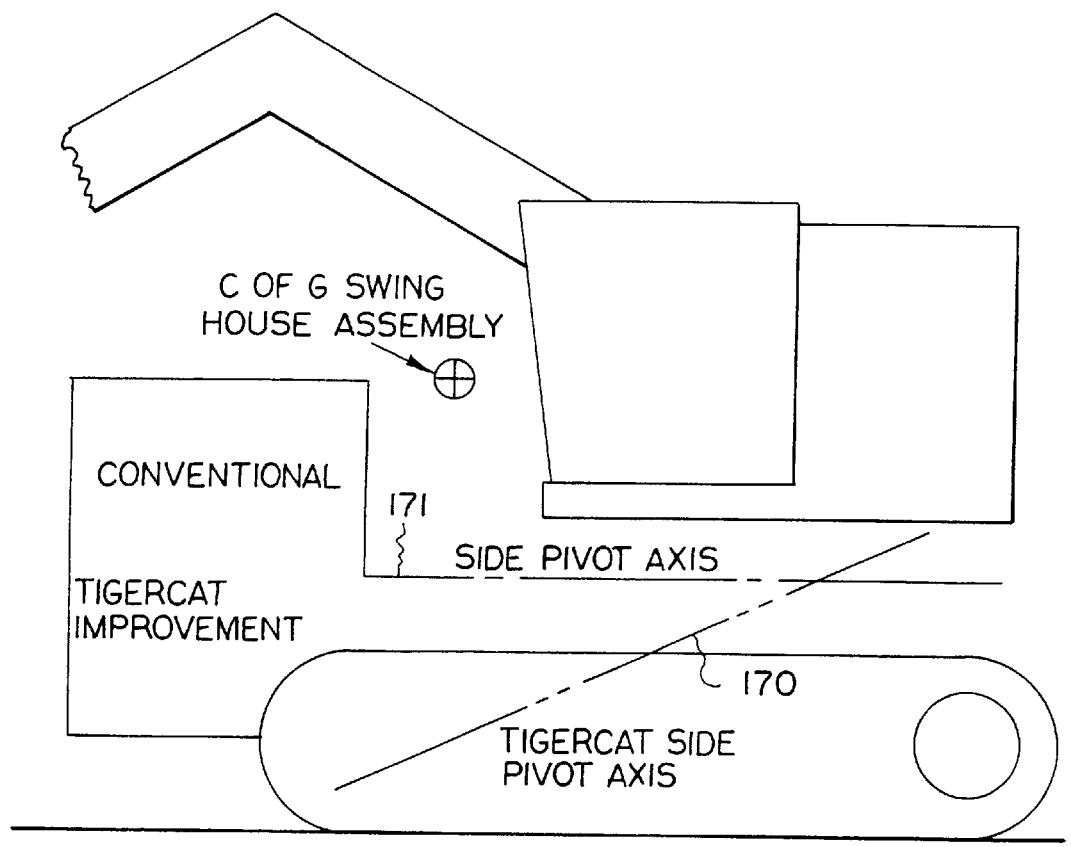
FIG. 5 is a schematic showing the pivot axes of the present invention compared to the prior art devices using no linkages.
Figure 6A:
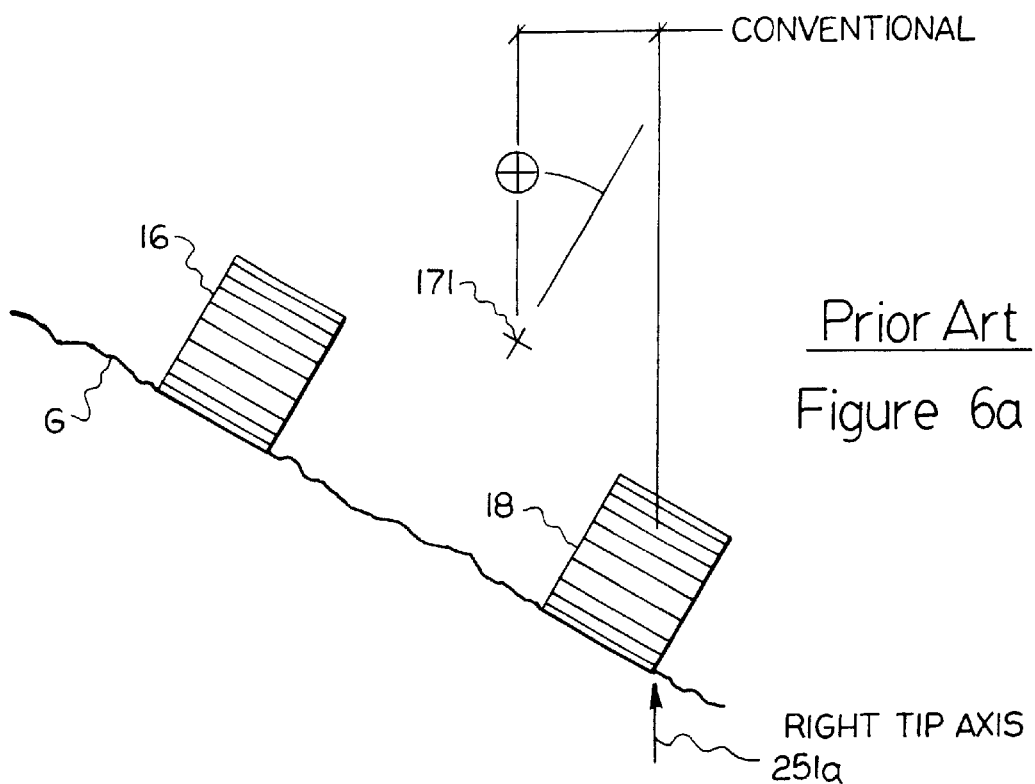
FIG. 6a illustrates the tip axis of the prior art and FIG. 6b illustrates the tip axis of the present invention.
Figure 6B:
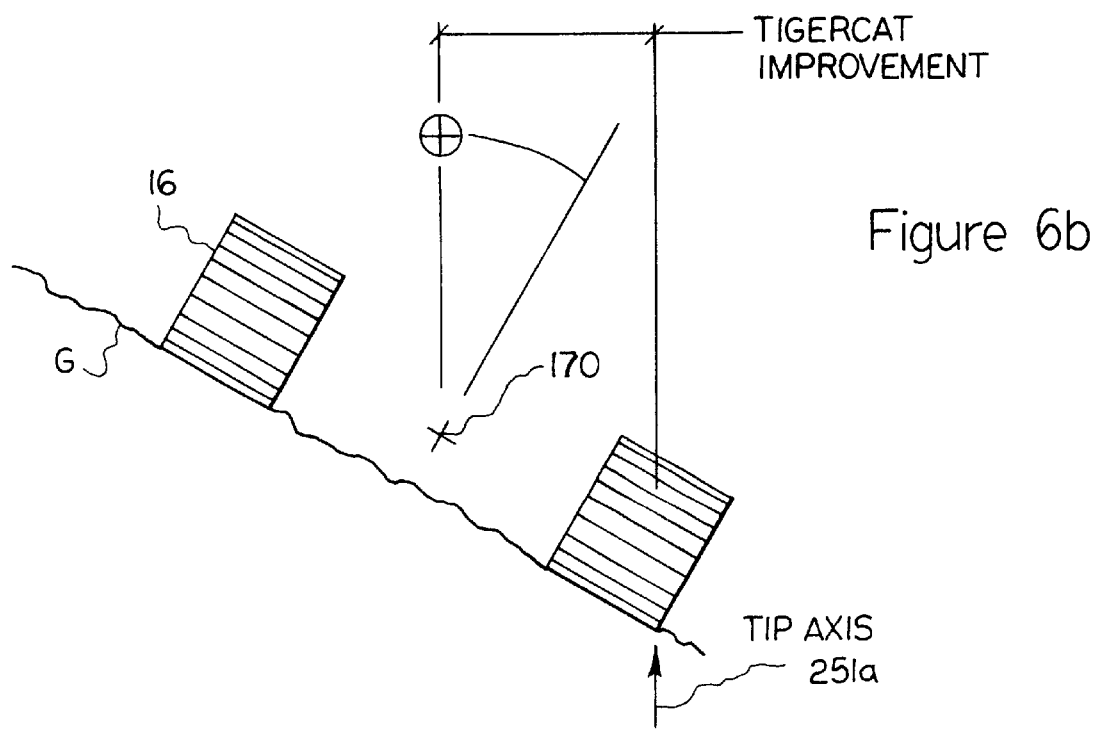

The side axis stabilizes the device by moving the center of gravity 171 to a position away from the tip axis 251a, as shown in FIG. 6b, in relation to prior art devices, as shown in FIGS. 5 and 6a.

A preferred embodiment of the invention has been described in considerable detail. Many modifications and variations to the preferred embodiment described will be apparent to those skilled in the art. Therefore, the invention should not be limited to the embodiment described, but should be defined by the claims which follow.

What is claimed is:

1. A leveling mechanism for a device that cuts trees, the device has at least a boom swing-house assembly connected to a frame of a ground engaging carriage, the swing-house assembly has at least a base that supports at least a boom and rotates around a turntable major axis; the leveling mechanism comprising:

an upper pivot support connected to the base having at least a first and a second side pivot axis lugs, at least a first and a second set of two corresponding rod end lugs, and a front edge, a rear edge, a left edge and a right edge;

each set of rod end lugs have a predetermined spacing therebetween, the first set is positioned on or near the left edge and the second set is positioned on or near the right edge;

each side pivot axis lug extends from the leveling support toward the carriage, the first side pivot axis lug is positioned on or near the front edge, the second side pivot axis lug is positioned on or near the rear edge, each side pivot axis lug has an aperture;

an intermediate pivot support having female lugs that receive the side pivot lugs to form a side pivot axis, and a bearing connection that connects the intermediate pivot support to the carriage to form a fore/aft pivot below the top tangential horizontal level of a front idler wheel and forward of the turntable major axis;

a first hydraulic cylinder has a distal end and a proximal end, the distal end attaches to the first set of rod end lugs, and the proximal distal end pivotally connects to the carriage;

a second hydraulic cylinder has a distal end and a proximal end, the distal end attaches to the second set of rod end lugs, and the proximal end pivotally connects to the carriage;

the first and the second hydraulic cylinders provide the force to pivot the swing-house assembly on side pivot axis and tilt the swing-house assembly on the fore/aft pivot.

2. The leveling mechanism of the device of claim 1 wherein the swing-house assembly rotates in a circle.

3. The leveling mechanism of the device of claim 1, wherein the distal end of the first and the second hydraulic cylinders are between the respective corresponding first and second set of rod end lugs.

4. The leveling mechanism of the device of claim 1 wherein the first and second hydraulic cylinders move the swing-house to obtain all possible operating degrees of freedom relative to the ground.

5. The leveling mechanism of the device of claim 1 wherein the side pivot axis is at an obtuse angle less than 130° from the turn table major axis and is in the direction of the predominate working zone.

* * * * *